US009117344B2

(12) United States Patent
Kitamura et al.

(10) Patent No.: US 9,117,344 B2
(45) Date of Patent: Aug. 25, 2015

(54) GAMING MACHINE RUNNING COMPETING GAME BETWEEN GAMING TERMINALS

(75) Inventors: Kenta Kitamura, Tokyo (JP); Masumi Fujisawa, Tokyo (JP); Hiroki Nakamura, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 166 days.

(21) Appl. No.: 13/426,000

(22) Filed: Mar. 21, 2012

(65) Prior Publication Data

US 2012/0252561 A1 Oct. 4, 2012

(30) Foreign Application Priority Data

Mar. 29, 2011 (JP) ................................ 2011-073063

(51) Int. Cl.
*G06F 17/00* (2006.01)
*G06F 19/00* (2011.01)
*G07F 17/32* (2006.01)

(52) U.S. Cl.
CPC ........ *G07F 17/3279* (2013.01); *G07F 17/3211* (2013.01); *G07F 17/3267* (2013.01); *G07F 17/3223* (2013.01)

(58) Field of Classification Search
USPC ..................................................... 463/25–26
See application file for complete search history.

(56) References Cited

U.S. PATENT DOCUMENTS 4,572,509 A * 2/1986 Sitrick ........................... 463/31
5,664,998 A * 9/1997 Seelig et al. .................... 463/20
5,772,509 A * 6/1998 Weiss ............................. 463/16
5,779,544 A * 7/1998 Seelig et al. ...................... 463/6
6,077,162 A * 6/2000 Weiss ............................. 463/26
6,217,448 B1 * 4/2001 Olsen ............................. 463/25
6,254,481 B1 * 7/2001 Jaffe .............................. 463/20
6,569,018 B2 * 5/2003 Jaffe .............................. 463/30
6,656,048 B2 * 12/2003 Olsen ............................. 463/25
6,800,026 B2 * 10/2004 Cannon .......................... 463/16
6,869,361 B2 * 3/2005 Sharpless et al. ............... 463/25
7,008,324 B1 * 3/2006 Johnson et al. ................. 463/42
7,314,408 B2 * 1/2008 Cannon .......................... 463/16

(Continued)

FOREIGN PATENT DOCUMENTS

JP 2004-236873 8/2004
JP 2008-534178 8/2008

OTHER PUBLICATIONS

JP Office Action dated Feb. 10, 2015, Application No. 2011-073063.

*Primary Examiner* — Steven J Hylinski
(74) *Attorney, Agent, or Firm* — Lex IP Meister, PLLC

(57) ABSTRACT

The present invention provides a gaming machine including gaming terminals having high payout rate without increasing loss on the management side. When a result of a base game associated with a payout is obtained, the gaming machine determines whether at least a competing game condition associated with the payout is satisfied or not and, when it is determined that the competing game condition is satisfied, sets neighboring gaming terminals as opponents. When the opponent participates in a competing game, a competing game for winning a payout by competing against the opponent is run. According to a result of the competing game, at least a part of the payout is given to the winner of the competing game, and no payout is given to the loser of the competing game.

20 Claims, 10 Drawing Sheets

(56) References Cited

U.S. PATENT DOCUMENTS

| | | | | |
|---|---|---|---|---|
| 7,500,913 | B2 * | 3/2009 | Baerlocher | 463/16 |
| 7,666,088 | B2 * | 2/2010 | Cannon | 463/25 |
| 7,666,092 | B2 * | 2/2010 | Kaminkow et al. | 463/25 |
| 7,771,270 | B2 * | 8/2010 | Kaminkow et al. | 463/22 |
| 7,780,531 | B2 * | 8/2010 | Englman et al. | 463/42 |
| 7,874,920 | B2 * | 1/2011 | Hornik et al. | 463/42 |
| 7,892,088 | B2 * | 2/2011 | Brandstetter et al. | 463/25 |
| 8,087,994 | B2 * | 1/2012 | Englman et al. | 463/21 |
| 8,100,760 | B2 * | 1/2012 | Cannon | 463/25 |
| 8,109,821 | B2 * | 2/2012 | Kovacs et al. | 463/16 |
| 8,187,068 | B2 * | 5/2012 | Slomiany et al. | 463/9 |
| 8,246,472 | B2 * | 8/2012 | Kaminkow et al. | 463/46 |
| 8,342,927 | B2 * | 1/2013 | Englman et al. | 463/6 |
| 8,444,482 | B2 * | 5/2013 | Aoki et al. | 463/25 |
| 8,574,066 | B2 * | 11/2013 | Cannon | 463/25 |
| 8,613,650 | B2 * | 12/2013 | Kovacs et al. | 463/16 |
| 2003/0119581 | A1 * | 6/2003 | Cannon et al. | 463/25 |
| 2004/0087368 | A1 * | 5/2004 | Gauselmann | 463/42 |
| 2005/0020340 | A1 * | 1/2005 | Cannon | 463/16 |
| 2006/0009283 | A1 * | 1/2006 | Englman et al. | 463/29 |
| 2006/0094495 | A1 * | 5/2006 | Gelber et al. | 463/20 |
| 2006/0121971 | A1 * | 6/2006 | Slomiany et al. | 463/16 |
| 2006/0166731 | A1 * | 7/2006 | Yoshimi et al. | 463/20 |
| 2009/0042644 | A1 * | 2/2009 | Zielinski | 463/27 |
| 2009/0124345 | A1 * | 5/2009 | Gilmore et al. | 463/20 |
| 2009/0191942 | A1 * | 7/2009 | Bennett | 463/20 |
| 2009/0227355 | A1 * | 9/2009 | Yoshizawa | 463/20 |
| 2009/0253514 | A1 * | 10/2009 | Nagano | 463/42 |
| 2012/0115593 | A1 * | 5/2012 | Vann et al. | 463/26 |
| 2012/0115608 | A1 * | 5/2012 | Pfeifer et al. | 463/35 |

* cited by examiner

GAMING MACHINE RUNNING COMPETING GAME BETWEEN GAMING TERMINALS

CROSS REFERENCE TO RELATED APPLICATION

The present application claims priority from Japanese Patent Application No. 2011-073063, which was filed on Mar. 29, 2011, the disclosure of which is herein incorporated by reference in its entirety.

BACKGROUND OF THE INVENTION

1. Field of the Invention

The present invention relates to a gaming machine for running a competing game between gaming terminals and a game controlling method thereof.

2. Description of Related Art

Conventionally, a gaming machine is set so that its payout rate is converged to a predetermined payout rate obtained by subtracting an exemption rate. By the setting, the manager managing a casino or the like having a gaming machine can obtain a profit.

The payout rate is an expectation value indicative of the rate of an amount which is paid back to a bet amount, and there is tendency that players select a gaming machine having high payout rate. There is consequently a trade-off problem such that when the payout rate is set to be low and the exemption rate is set to be high, the operation rate of the gaming machine decreases and, when the payout rate is set to be high, the profit obtained from the gaming machine decreases.

An object of the present invention is to provide a gaming machine including a gaming terminal having a high payout rate without increasing loss on the management side.

SUMMARY OF THE INVENTION

The present invention relates to a gaming machine having two neighboring gaming terminals, including: a base game running unit for running a base game independently in each of the gaming terminals on the basis of a predetermined payout rate; a payout giving unit for giving a payout on the basis of a result of the base game; a competing game condition determining unit for determining whether the result of the base game satisfies a predetermined competing game condition or not; an opponent setting unit, in the case where it is determined that the competing game condition is satisfied, for setting the neighboring gaming terminals as opponents; a competing game running unit, when the opponent participates in the competing game, for running the competing game for wining a payout by competing against the opponent; and a payout adjusting unit, as a result of the competing game, giving at least a part of the payout to the winner of the competing game and giving no payout to the loser of the competing game.

With the configuration, whether the result of the base game satisfies the competing game condition or not is determined. In the case where it is determined that the competing game condition is satisfied, the neighboring gaming terminals are set as opponents. When the opponent participates in the competing game, the competing game is played between the neighboring gaming terminals. At least a part of the payout is given to the winner of the competing game, and no payout is given to the loser. Consequently, the payout rate for the winner of the competing game is increased only by the amount of the payout which is not given to the loser. That is, the payout is transferred between the gaming terminals, so that the gaming machine can maintain a constant payout rate. As a result, without increasing loss on the management side of the gaming machine, a gaming terminal having a high payout rate can be provided.

The opponent setting unit of the gaming machine of the present invention may have an opponent resetting unit, in the case where the opponent does not participate in the competing game, for setting as the opponent a previously programmed computer.

With the configuration, even in the case where the competing game with the neighboring gaming terminal is not realized, the competing game can be played with a virtual opponent by the computer. This makes the game more interesting.

The gaming machine of the present invention may further include a competing game refusing unit, when set as the opponent, capable of refusing participation in the competing game by an operation from the outside.

With the configuration, whether the gaming machine participates in the competing game or not can be selected by the intension of the player as an opponent, flexibility can be given to handling of the competing game between the neighboring gaming terminals.

The payout adjusting unit of the gaming machine of the present invention may increase the payout to be given, each time the competing game is repeated.

With the configuration, each time the competing game is repeated, the payout to be transferred is increased. Consequently, the player feels like continuing the game.

The competing game running unit of the gaming machine of the present invention may determine win or loss of the competing game on the basis of an option selected by an operation from the outside.

With the configuration, win or loss of the competing game is determined on the basis of the option selected by the intention of the player. This makes the game more interesting.

The competing game running unit of the gaming machine of the present invention allocates a payout whose amount is determined at random on the basis of an obtained random determination item or a payout whose amount is predetermined, to each of the opponents by an operation from the outside and determines win or loss of the competing game on the basis of the amount of the payout.

With the configuration, by the intention of the player, either the payout whose amount is determined at random or the payout of the predetermined amount is determined, and win or loss is determined according to the result of the random determination. This makes the game more interesting.

The present invention can provide a gaming terminal having high payout rate.

DESCRIPTION OF THE PREFERRED EMBODIMENTS (Outline of Gaming Machine)

An embodiment of the present invention will be described with reference to the drawings.

Figure 1:
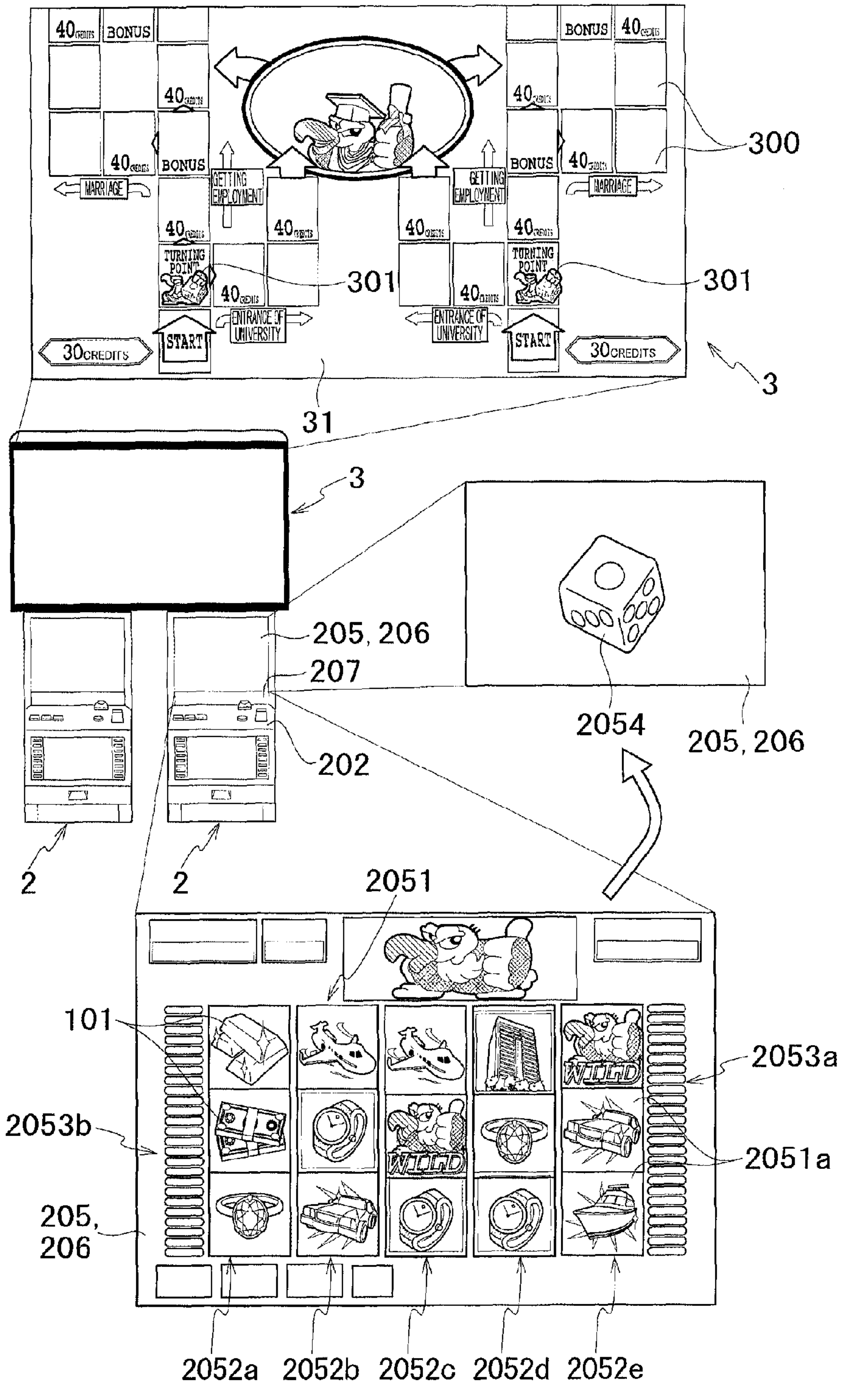
FIG. 1 is an explanatory diagram showing a playing method of a gaming machine.

As shown in FIG. 1, a gaming machine 1 according to the present embodiment has two neighboring gaming terminals (slot machines 2) and one common display 3. In the gaming machine 1, when a competing game start condition is satisfied during running of a base game, the neighboring gaming terminals are set as opponents to each other, and a start process of whether a competing game is run or not is executed. A competing game of fighting for winning of a payout (competing game payout) in accordance with a win or loss result can be played between the neighboring gaming terminals. As a result of the competing game, at least a part of the competing game payout is given to a winner which wins the competing game, and the payout is not given to the loser of the competing game.

The competing game is triggered by an auxiliary unit game which is repeatedly played when the competing game start condition is satisfied. Specifically, in the auxiliary unit game, pieces 301 corresponding to the gaming terminals move on a plurality of chained frames 300 displayed on the common display 3. In the case where the frame 300 on which the piece 301 is stopped corresponds to the trigger of the competing game, the competing game is run. In the common display 3, scroll-display is performed with the movement of the piece 301.

(Outline of Gaming Machine: Function Flow)

Figure 2:
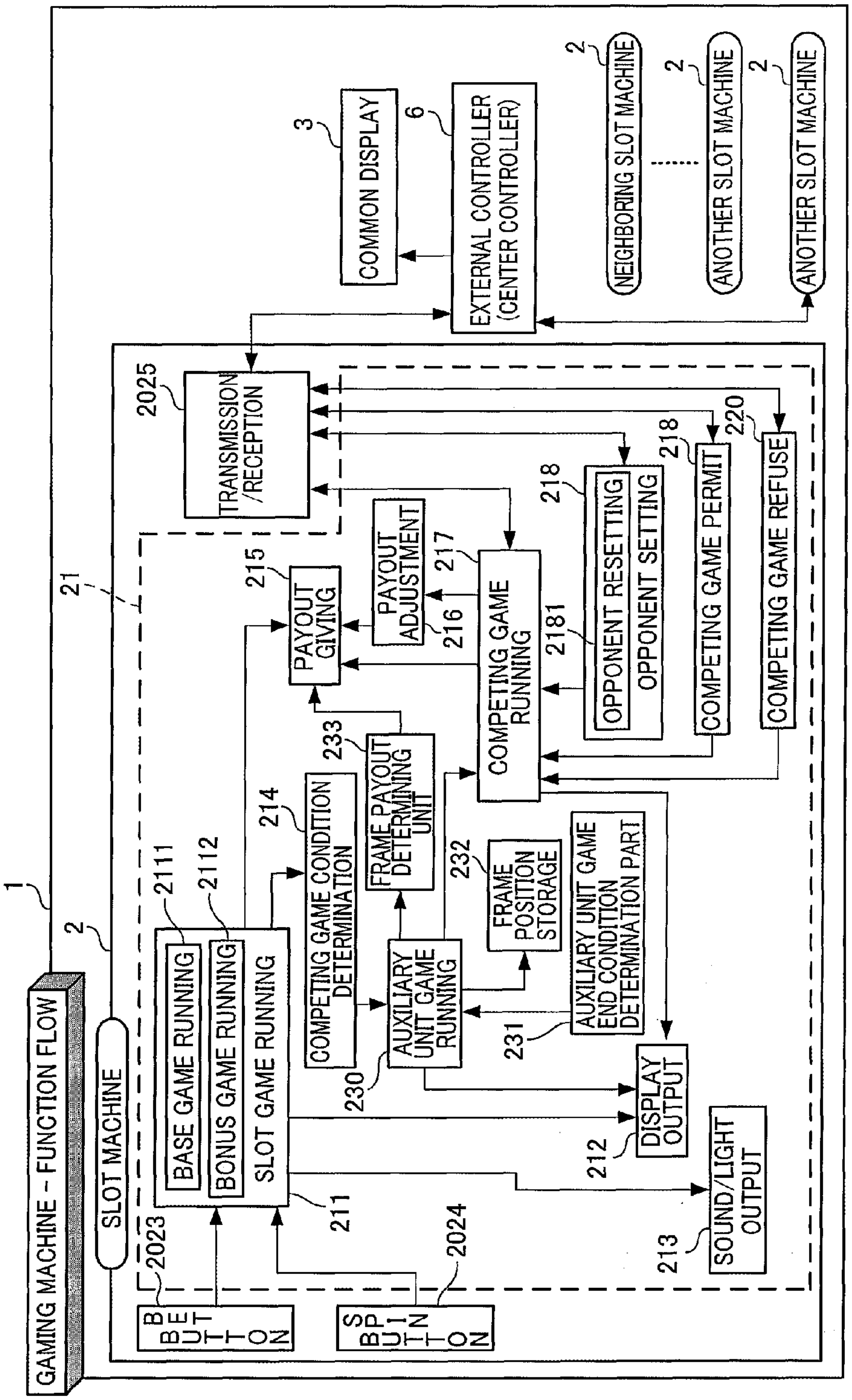
FIG. 2 is an explanatory diagram showing a function flow of the gaming machine.

Concretely, as shown in FIG. 2, the gaming machine 1 is constructed for multiple players. A plurality of slot machines 2 are connected to a center controller 6 (external controller) so that data communication can be performed, and the slot machines 2 are connected to one another so that data communication can be performed. The center controller 6 has the function of remote-operating and remote-monitoring processes such as changing of the operation state of each of the slot machines 2, and various game setting values, and the like. The gaming machine 1 enables each of the slot machines 2 to play individually a base game such as a slot game and also enables a competing game such as the game of life to be synchronously played between the neighboring slot machines 2.

The connection among the slot machines 2 and the connection between the slot machines 2 and the center controller 6 may be carried out with/without wires. In a slot game and a competing game, the unit of a bet or a payout may be a currency of a country or a region such as dollar, yen, or Euro, or a game point which is used only in a hall or a market in which the gaming machine 1 is installed.

The gaming machine 1 has the common display 3. One common display 3 is allocated to the two slot machines 2 which are disposed side by side. The details of the common display 3 will be described later.

The slot machine 2 has a terminal controller 21 and a bet button 2023, a spin button 2024, and a transmission/reception unit 2025 which are connected to the terminal controller 21. The slot machine 2 has a sound/light output unit 213 and a display output unit 212. The sound/light output unit 213 has the function of driving effect devices such as a speaker and a lamp. The display output unit 212 has the function of displaying various display data on the display panel.

The terminal controller 21 has a slot game running unit 211. The slot game running unit 211 has a base game running unit 2111 and a bonus game running unit 2112. The base game running unit 2111 has the function of running a base game. The bonus game running unit 2112 has the function of running a bonus game.

In this case, a "base game" denotes a game which is run using a bet of a game value as a condition and pays a game value of the amount according to rearranged symbols 101. In other words, the base game" is a game started on precondition of consumption of the game value. A "bonus game" is synonymous with a feature game. The bonus game may be a game of any kind as long as the bonus game is in a gaming mode more advantageous than the base game. The "rearrangement" denotes a state where after arranging the symbols 101 is dismissed, the symbols 101 are rearranged. The "arrangement" means a state where the symbols 101 can be visually recognized by players on the outside.

Further, the terminal controller 21 has: a payout giving unit 215 giving a payout on the basis of a result of a base game; a competing game condition determining unit 214, at the time of the result of the base game associated with the payout, determining whether at least a competing game condition associated with the payout is satisfied or not; an opponent setting unit 218, when it is determined that the competing game condition is satisfied, setting two neighboring slot machines 2 as opponents; a competing game running unit 217, when the opponent participates in the competing game, running the competing game for winning a payout by competing against the opponent; and a payout adjusting unit 221, as a result of the competing game, giving at least a part of the payout to the winner of the competing game and giving no payout to the loser of the game.

In the slot machine 2 having the game result associated with the payout in the base game, whether at least the competing game condition associated with the payout is satisfied or not is determined. In the case where it is determined that the competing game condition is satisfied, neighboring slot machines 2 are set as opponents each other. When the opponents participates in the competing game, the competing game is played between the neighboring slot machines 2. At least a part of the payout is given to the winner of the competing game, and the payout is not given to the loser. Therefore, for the winner of the competing game, the payout rate increases only by the amount which is not given to the loser. That is, since the payout is transferred between the slot machines 2, the constant payout rate can be maintained in the gaming machine. As a result, without increasing a loss on the management side of the gaming machine 1, the slot machine 2 of high payout rate can be provided.

The "competing game condition" may be any one of a condition based on the payout, a condition based on accumulated payouts, and a condition based on a balance obtained by subtracting a game fee required to run a base game from the payout. Further, the "competing game condition" may be any of a direct payout and an indirect payout as long as the condition is associated with at least the payout. For example, the "competing game condition" may be satisfied, for example, when a result of a base game is winning of a bonus or a jackpot. In this case, since the competing game condition can be selected by a combination of a plurality of conditions, flexibility of setting the frequency of the competing game can be easily increased.

The terminal controller 21 also has a competing game refusing unit 220 which, when the terminal is set as an opponent, can refuse participation in the competing game by an operation from the outside. In the gaming machine 1, the player as an opponent can determine whether the player participates in the competing game or not, so that flexibility can be given to handling of the competing game between the neighboring slot machines 2.

The opponent setting unit 218 in the terminal controller 21 also has an opponent resetting unit 2181 which sets as the opponent a previously programmed computer when the opponent does not participate in the competing game. Consequently, in the gaming machine 1, even in the case where a competing game with the neighboring slot machine 2 is not realized, a competing game can be played with a virtual opponent in the computer. This makes the game more interesting.

The payout adjusting unit 221 in the terminal controller 21 may increase the competing game payout to be given, each time the competing game is repeated. Since the payout to be transferred is increased each time the competing game is repeated, the player desires to continue the play.

Further, the competing game running unit 217 in the terminal controller 21 may determine win or loss of the competing game on the basis of an option selected by an operation from the outside. Since win or loss of the competing game is determined on the basis of the option selected by the intension of the player. This makes the game more interesting.

The competing game running unit 217 in the terminal controller 21 may allocate a payout whose amount is determined at random on the basis of an obtained random determination item or a payout whose amount is predetermined, to each of the opponents by an operation from the outside and may determine win or loss of the competing game on the basis of the amount of the payout. Since either the payout whose amount is determined at random or the payout of the predetermined amount is determined by the intention of the player and win or loss is determined on the basis of the random determination, the game is made more interesting.

In the embodiment, the terminal controller 21 also has an auxiliary unit game running unit 230 repeatedly running an auxiliary unit game as a trigger of running a competing game when an opponent participates in the competing game. The center controller (external controller) 6 as a display controller displays the linked many frames 300 and the pieces 301 corresponding to the slot machines 2 on the common display 3, displays the pieces 301 each moved by the number of frames according to the result of the auxiliary unit game in a predetermined direction, and performs scroll-display in accordance with the movement display. The competing game running unit 217 runs a competing game when the piece is stopped on a frame associated with a trigger to run a competing game.

After that, whether the result of the base game satisfies the competing game condition or not is determined. In the case where it is determined that the competing game condition is satisfied, the neighboring slot machines 2 are set as opponents. When the opponent participates in the competing game, the competing game is played by the neighboring slot machines 2. The competing game is started when the piece 301 is stopped on the frame 300 as a trigger in the auxiliary unit game in which the piece 301 on the frames 300 is moved while the screen of the common display 3 is scrolled. Therefore, the competing game is run when the auxiliary unit game is repeated and the piece 301 is stopped in a predetermined position on the frames 300 of the common display 3, so that it makes the player feel like continuing the game.

The terminal controller 21 also has an auxiliary unit game end condition determination part 231 of determining whether an auxiliary unit game end condition of finishing repetition of the auxiliary unit game is satisfied or not and a frame position storage 232 of storing the position in the frame 300, of the piece 301 at the end of the auxiliary unit game. With the configuration, even in the case where repetition of the auxiliary unit game for triggering the competing game is finished, the position in the frame 300 of the piece 301 at the end is stored, and the auxiliary unit game can be restarted from the position of the frame 300. It makes the player want to continue the game.

In the embodiment, the terminal controller 21 also has a frame payout determining unit 233 of determining a payout in accordance with the frame 300 on which the piece 301 is stopped. Each time repetition of the auxiliary unit game ends, the payout for the frames 300 in a range where the frame 301 can move increases. Consequently, even when the payout is given each time the piece 301 stops and repetition of the auxiliary unit game ends, the payout for the frame 300 increases at the time of restart, and it makes the player want to continue the game more.

When the pieces 301 corresponding to the two slot machines 2 enter a predetermined stop mode, a frame payout determining unit 233 in the terminal controller 21 gives a special payout. Since a special payout is given in the case where the pieces 301 corresponding to the two gaming terminals enter a predetermined stop mode, the neighboring two slot machines 2 play the game cooperatively, which improves entertainment characteristic of the gaming machine 1.

The function blocks of the terminal controller 21 and the center controller 6 constructed as described above are realized by an arithmetic unit and a storage mounted on a circuit board and an information processor having an interface. The gaming machine 1 having the slot machines 2 each having the terminal controller 21 and the center controller 6 is programmed to execute the processes of the functions.

(Mechanical Configuration of Slot Machine 2)

The slot machine 2 having the above-described functions has the terminal controller 21 as described above in the cabinet and has a symbol display device 205 in the front face as shown in FIG. 1. The symbol display device 205 is formed by a transparent liquid crystal panel all of which, or an arbitrary part of which can be changed to a transparent state.

The symbol display device 205 has, as shown in FIG. 1, a display window 2051 in its center. The display window 2051 is made of total 15 pieces of display blocks 2051*a* in three rows and five columns. In the three display blocks 2051*a* in the columns, pseudo reels 2052*a* to 2052*e* are formed. The pseudo reel 2052*a* to 2052*e* are moved downward while the three display blocks 2051*a* change speed as a whole, thereby enabling rearrangement of rotating the symbols 101 displayed on the display blocks 2051*a* in the vertical direction and, after that, stopping them.

On the right and left sides of the display window 2051, payline occurrence columns 2053*a* and 2053*b* are disposed bilaterally symmetrically. Each of the payline occurrence columns 2053*a* and 2053*b* has many payline occurrence parts. An activated payline can be formed by the payline occurrence parts on both sides. A payline is activated by connecting the payline occurrence parts on both sides. In the other case, the payline is inactive. The number of paylines to be activated is determined on the basis of a bet amount. In the case of MAXIMUM BET as the maximum bet amount, the largest number of paylines L are activated. By the activated payline, various winning combinations of the symbols 101 are satisfied.

The symbol display device 205 displays a dice 2054 as shown in FIG. 1 in the auxiliary unit game which is repeatedly run when the competing game start condition is satisfied and an opponent is set. The pips in of the dice 2054 displayed is determined at random by the terminal controller 21 and displays the number of frames the piece 301 is to be moved on the frames 300 in the common display 3. Although the pips in the dice are determined by a program in the computer in the present embodiment, the invention is not limited to the case. For example, a physical dice may be actually rotated by air or the like and the pips in the dice may be read by a sensor or the like.

A touch panel 206 is provided in the front face of the symbol display device 205. By the touch panel 206, various operation data can be entered by a pushing operation by the player. As shown in FIG. 1, a PTS terminal 207 and a control panel 202 are disposed in this order below the symbol display device 205.

The PTS terminal 207 is a unit in which an LCD, a microphone, a human body detection camera, and the like are integrated and includes various devices having a microphone function, a camera function, a speaker function, a display function, and the like. The PTS terminal 207 can transmit/receive various data related to games such as credit data by mutually communicating with the terminal controller 21 and a not-shown administration server. The control panel 202 has various buttons such as the bet button 2023 in FIG. 2, a coin entry from which a coin is entered into a cabinet 201, and a bill entry from which a bill is entered.

(Common Display 3)

As shown in FIG. 1, two slot machines 2 constructed as described above are disposed side by side. On the fop face of the slot machines 2, the common display 3 is provided. The common display 3 is formed by a display device such as a liquid crystal display panel and displays a competing game screen 31.

(Competing Game Screen 31)

Figure 3:
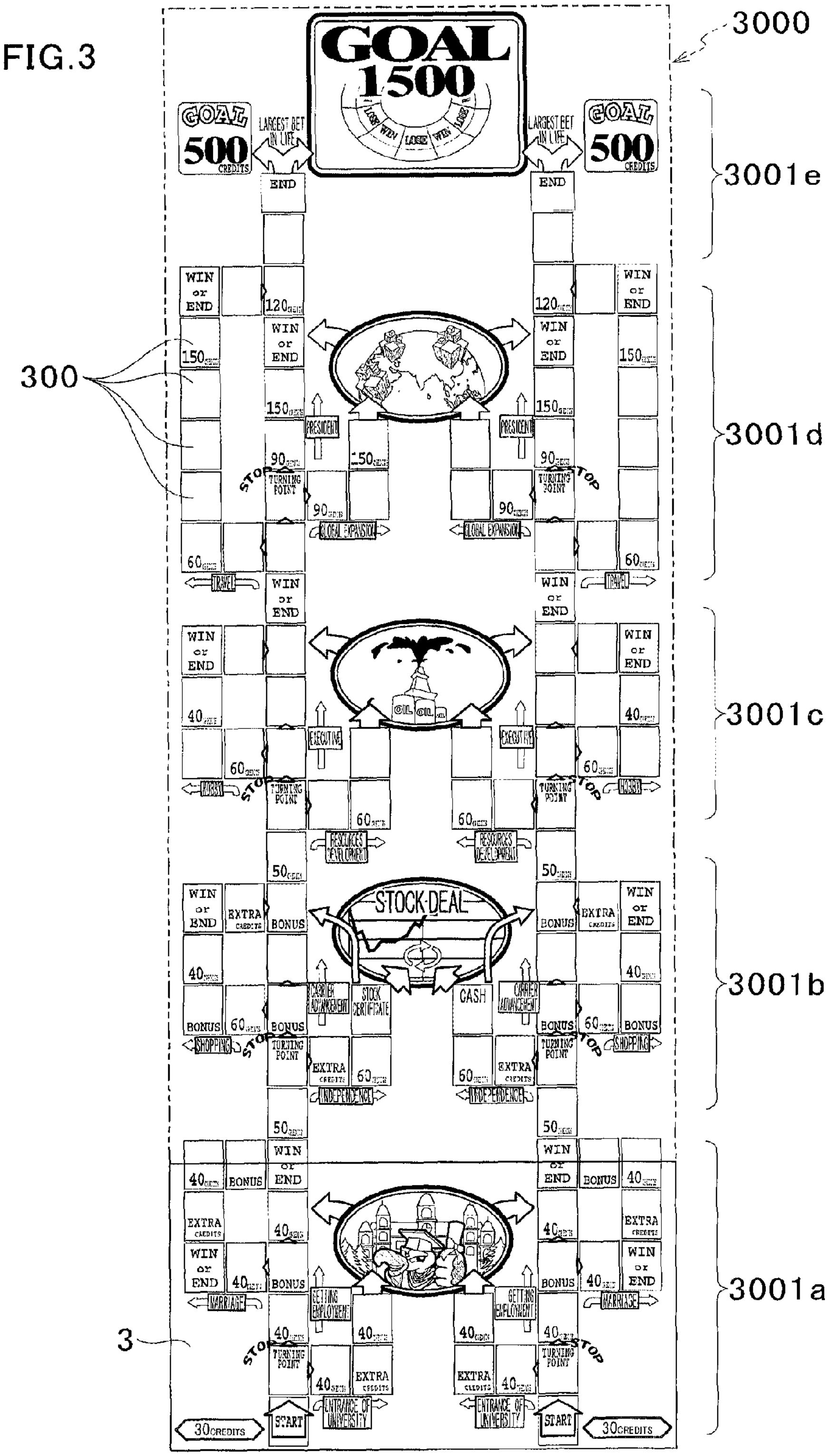
FIG. 3 is an explanatory diagram showing entire paths displayed on a competing game screen.

The competing game is, for example, the game of life. The start position of the piece 301 expressed by a game character is set near the upper end of each slot machine 2, and a path 3000 is formed by many frames 300 from the departure position to the goal. FIG. 3 shows the entire path 3000. Specifically, images of the path 3000 as shown in FIG. 3 are stored in a storage area in the center controller 6 and are scroll-displayed according to the position in the path 3000, of the piece 301. As shown in FIG. 3, the path 3000 is formed so that the frames 300 are bilaterally symmetrical, and the frames 301 on each side serve as the path in which the piece 301 corresponding to the slot machine 2 on the corresponding side travels.

The frames 300 forming the path 3000 have many process parts and branch parts in which the piece 301 travels and stops according to the pips in the dice in each auxiliary unit game. The process parts are set so as to execute various operations and processes. The branch parts are parts in which the path is branched to some directions and, for example, the branch direction is determined according to the pips in the dice or an input of the player.

The frames 300 in the process parts will be described concretely.

As the frames 300 in the process parts, the path 3000 has an auxiliary unit game end condition determination part, a fixed payout part, and a competing game trigger part. In the case where the piece 301 stops in the auxiliary unit game end condition determination part, whether or not repetition of the auxiliary unit game including determination of the pips in the dice, travel of the piece 301, and a process according to the frame in which the piece 301 stops is finished or not is determined.

Specifically, with the repetition of the auxiliary unit game, the piece 301 can move within a range of frames 300 (end determination range) sandwiched by the auxiliary unit game end condition determination parts. In the example of FIG. 3, the path 3000 has five end determination ranges 3001 (end determination ranges 3001*a* to 3001*e*) and, in every interval, the auxiliary unit game end condition determination part exists.

In the case where the piece 301 stops in the fixed payout part, a fixed payout is given to the slot machine 2 associated with the piece 301 stopped in the frame 300. In the case where the pieces 301 associated with two slot machines enter a predetermined stop mode, such a special payout may be given. For example, in the case where the piece 301 stops in the fixed payout part in which the two frames 300 are disposed bilaterally symmetrical, a fixed payout may be given.

The fixed payout of the fixed payout part may differ according to the frames 300 and, for example, the payouts in the fixed payout parts in the end determination ranges 3001 may be different from one another. For example, the payouts of the fixed payout parts may increase in the travel direction of the end determination ranges 3001. That is, when the piece arrives at the auxiliary unit game end condition determination part and the next auxiliary unit game is to be repeated, higher payouts than those in the past are distributed to the frames in the range in which the piece can move. The player therefore feels like continuing the game.

In the case where the piece 301 of any of the slot machines 2 stops in the competing game trigger part, a competing game is run. For example, the competing game trigger part may be set for each end determination range 3001, and the competing game payout may increase in the travel direction. That is, each time the competing game is repeated, the competing game payout to be given increases.

An example of the competing game will be described. FIGS. 4 to 7 are explanatory diagrams each showing an example of the competing game screen 31 displayed on the common display 3. By displaying similar screens in the symbol display device 205 in each of the slot machines 2, input by the touch panel 206 may be facilitated.

Figure 4:
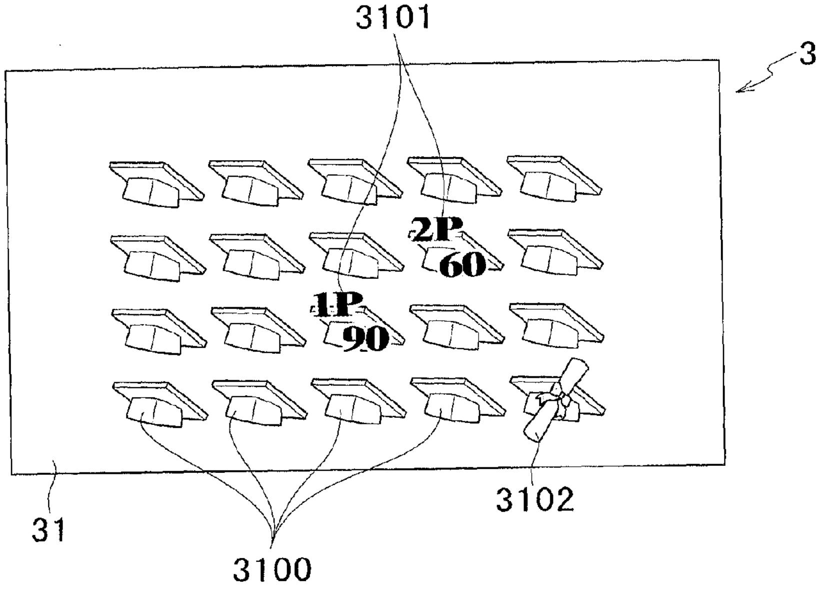
FIG. 4 is an explanatory diagram showing an example of the competing game screen.

In a competing game screen of FIG. 4, a number of hat symbols 3100 as options are displayed. The hat symbols 3100 are associated with a competing game payout and a fixed payout smaller than the competing game payout and are selected by the slot machines 2 in turns so that a fixed payout symbol 3101 indicating a fixed payout or a competing game payout symbol 3102 is displayed. That is, the slot machine 2 selecting the hat symbol 3100 corresponding to the competing game payout first can obtain the competing game payout.

Figure 5:
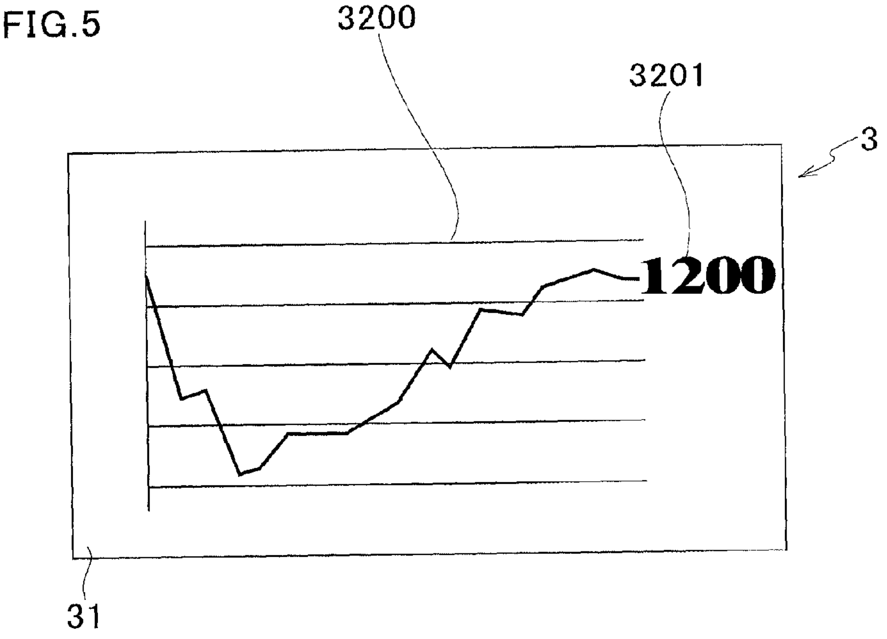
FIG. 5 is an explanatory diagram showing an example of the competing game screen.

In the competing game screen of FIG. 5, a stock chart image 3200 and a competing game payout symbol 3201 are displayed. Although not shown, the slot machine 2 selects the fixed payout or a competing game payout (random determination item) in advance. The slot machine 2 selecting the random determination item of the competing game payout determines the competing game payout at random, and gives the determined payout. To the slot machine selecting the fixed payout, the predetermined payout is given. For example, in the case where the fixed payout is 1000 and the competing game payout is 1200, the slot machine 2 selecting the competing game allocation wins the game.

It is also possible to preliminarily distribute any of the payouts to the slot machines 2, allow the slot machines 2 to determine whether they exchange the payouts or not and, only in the case where both of the slot machines 2 select exchange, run the competing game. In the case where no competing game is run (exchange is not performed), the fixed payout may be given to both of the slot machines 2.

Figure 6:
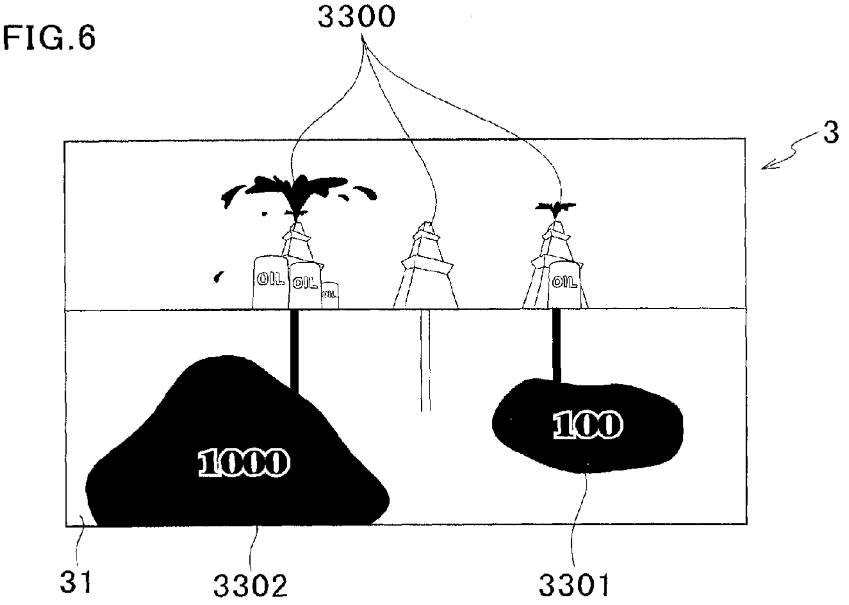
FIG. 6 is an explanatory diagram showing an example of the competing game screen.

In the competing game screen of FIG. 6, three oilfield symbols 3300 as options are displayed. The oilfield symbol 3300 is associated with a competing game payout, a fixed payout smaller than the competing game payout, or no payout. Each of the slot machines 2 selects one oilfield symbol 3300, a competing game payout symbol 3302 is displayed for the oilfield symbol 3300 corresponding to the competing game payout, and a fixed payout symbol 3301 is displayed for the oilfield symbol 3300 corresponding to the fixed payout. That is, the slot machine 2 selecting the oilfield symbol 3300 corresponding to the competing game payout can obtain the competing game payout.

Figure 7:
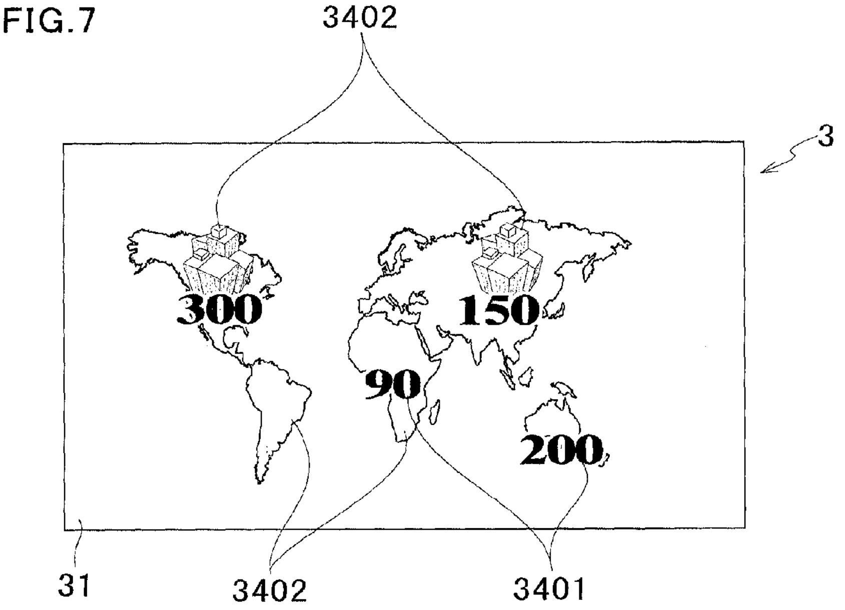
FIG. 7 is an explanatory diagram showing an example of the competing game screen.

In the competing game screen of FIG. 7, three region symbols 3400 as options are displayed. The region symbols 3400 are associated with fixed payouts smaller than the competing game payout and, in the case where the region symbols 3400 are selected, fixed payout symbols 3401 are displayed, and the region symbols 3400 are painted (not shown). The slot machines 2 select the region symbols 3400 in turns. In the case where the slot machines 2 select the same region symbol 3400 in the same turn, the slot machine 2 which wins at random can obtain the fixed payout of the region symbol 3400. Finally, the slot machine 2 that paints all of the region symbols 3400 can obtain the competing game payout.

A game itself of repeating the auxiliary unit game and traveling in such a path 3000 is the competing game. The slot machine 2 whose piece 301 arrives at the goal first wins, and the other slot machine 2 loses. That is, the competing game payout is given to the slot machine 2 arriving at the goal first. A payout smaller than the competing game payout may be given to the slot machine 2 arriving next.

(Process Operation of Slot Machine 2: Base Game Running Process)

Figure 9:
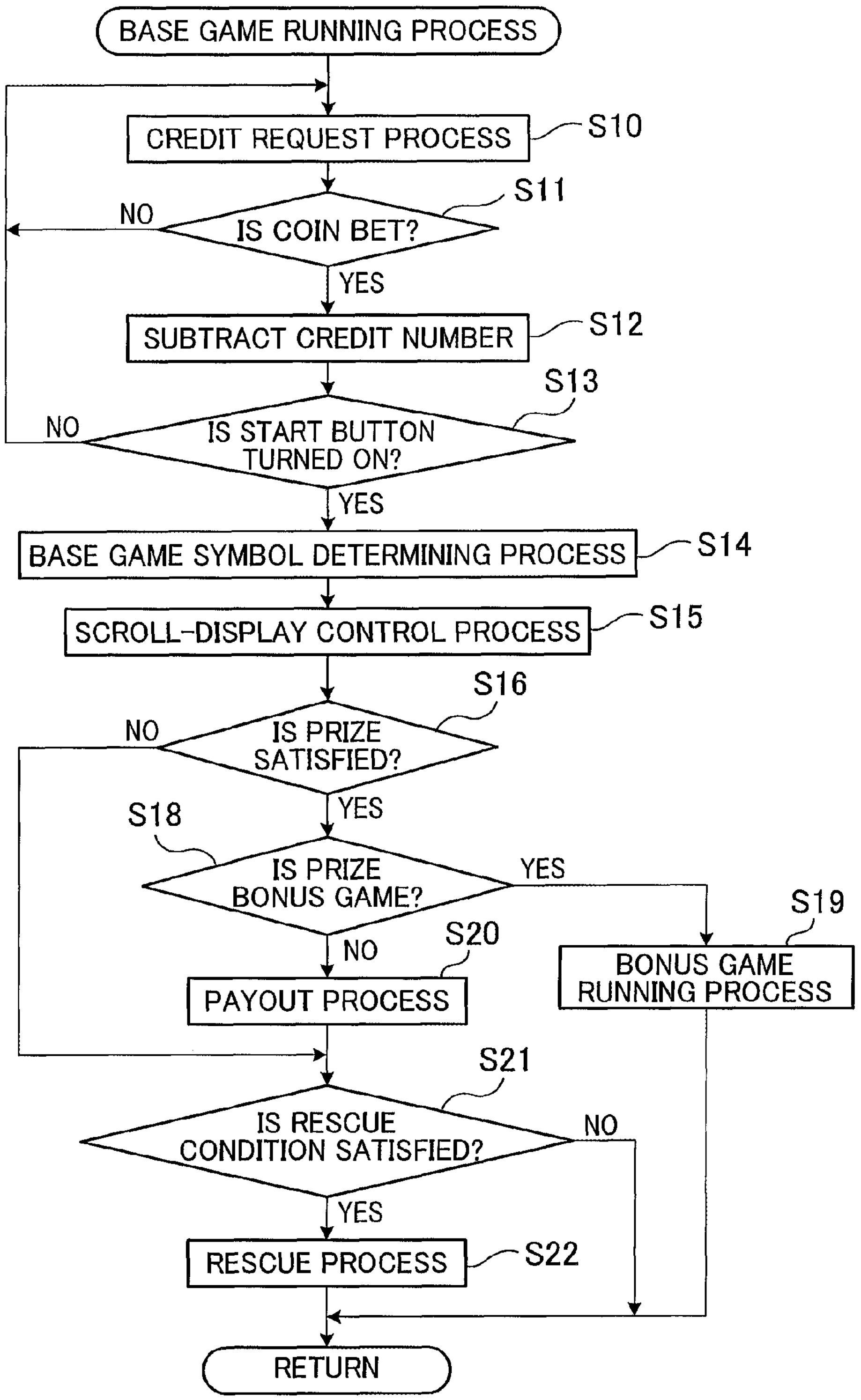
FIG. 9 is a flowchart of a base game running process.

In the above-described configuration, when a base game running process routine is executed in the terminal controller 21 of the slot machine 2, as shown in FIG. 9, a credit request process is executed (S10) and, after that, whether a coin is bet or not is determined (S11). In the case where no coin is bet (NO in S11), the process is re-executed from S10. On the other hand, when a coin is bet (YES in S11), a credit amount is subtracted (S12) and, subsequently, whether the start button is turned on by a pushing operation or not is determined (S13).

In the case where the start button is not turned on (NO in S13), the process is re-executed from S10. On the other hand, when the start button is turned on (YES in S13), a base game symbol determining process is executed (S14). After that, a scroll-display control process is executed, scrolling of the symbols 101 is started and, after that, display is controlled so as to rearrange the symbols 101 determined in S14 (S15).

Next, whether a prize is satisfied or not is determined (S16). In the case where a prize is not satisfied (NO in S16), whether a rescue condition such as repetition of a base game more than predetermined number of times is satisfied or not is determined (S21). In the case where the rescue start condition is not satisfied (NO in S21), the routine is finished. On the other hand, in the case where the rescue start condition is satisfied (YES in S21), a rescue process of paying a predetermined payout is executed (S22) and, the routine is finished.

In the case where a prize is satisfied (YES in S16), whether the prize is a bonus game or not is determined (S18). In the case where the prize is a bonus game (YES in S18), the bonus game running process is executed and the process is switched from the base game to the bonus game (S19). When the bonus game ends, the routine is finished. On the other hand, when the prize is not the bonus game (NO in S18), a payout process is executed, and a payout associated with the prize is made (S20). After that, whether the rescue condition is satisfied or not is determined (S21). When the rescue condition is satisfied (YES in S21), the rescue process is executed (S22) and, after that, the routine is finished.

(Competing Game Condition Determining Process)

Figure 10:
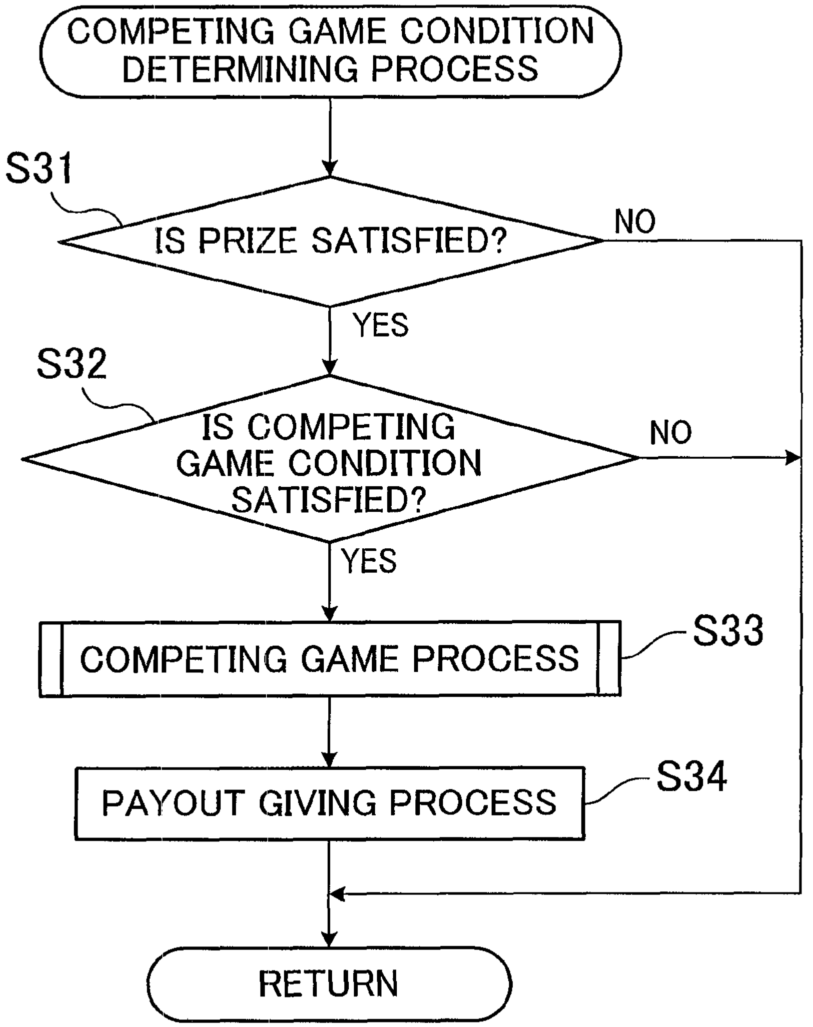
FIG. 10 is a flowchart of a competing game condition determining process.

When the base game running process is executed as described above, as shown in FIG. 10, a competing game determining process is executed independently in parallel. In the competing game condition determining process, whether a prize is satisfied in the base game process or not is determined (S31). If no prize is satisfied (NO in S32), the routine is finished, and S31 is executed repeatedly.

On the other hand, in the case where a prize is satisfied (YES in S31), whether a competing game condition is satisfied or not is determined (S32). In the case where the competing game condition is not satisfied (NO in S32), the routine is finished, and S31 is executed repeatedly. In the case where the competing game condition is satisfied (YES in S32), the competing game process is executed (S33). A payout process is executed to make a payout on the basis of a game result in the competing game process (S34) and, after that, the routine is finished.

(Competing Game Process)

Figure 8:
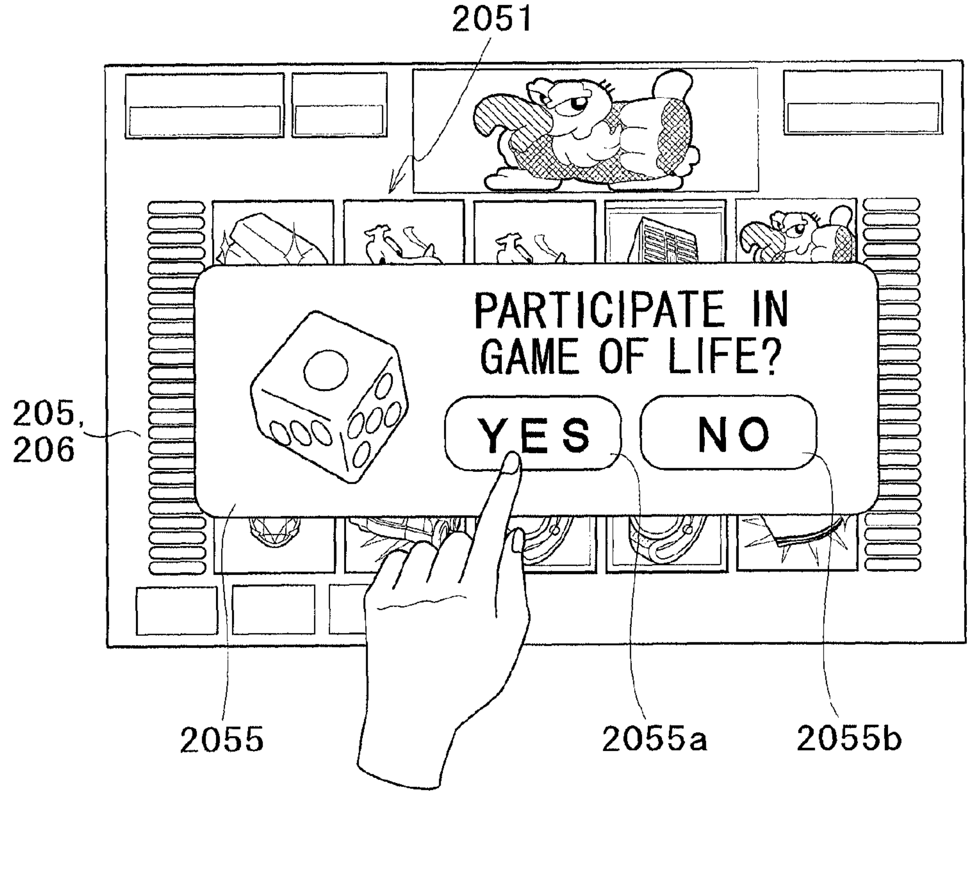
FIG. 8 is an explanatory diagram showing a competing game response screen.
Figure 11:
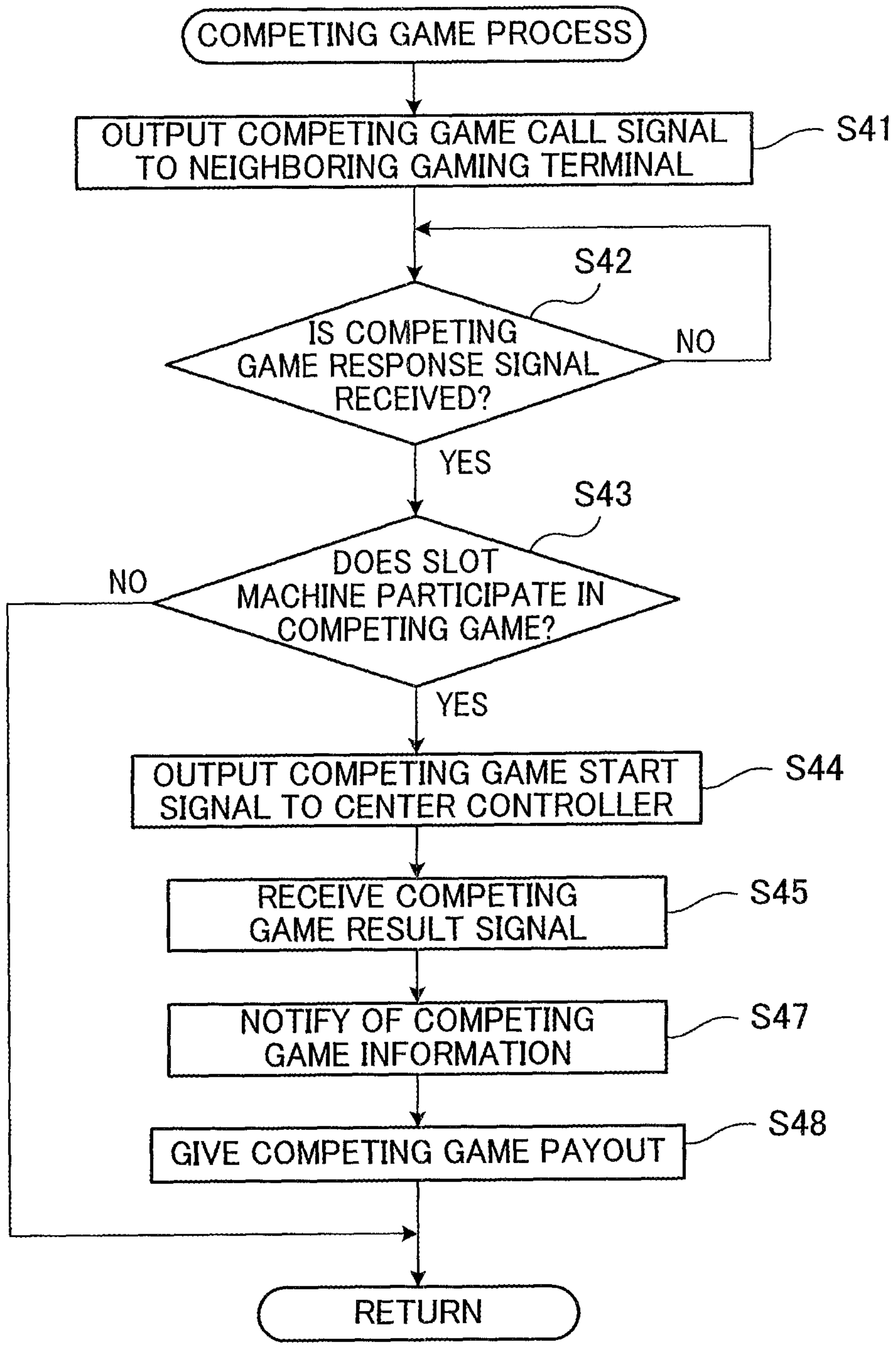
FIG. 11 is a flowchart of a competing game process.

In the competing game condition determining process, when the competing game process is executed (S33), as shown in FIG. 11, first, a competing game call signal is output to the slot machine 2 as the neighboring gaming terminal (S41). In the case where the slot machine 2 receives the competing game call signal which is output in step S41, as shown in FIG. 8, a competing game response screen 2055 having response buttons 2055*a* and 2055*b* of “YES” and “NO” is displayed. When the player operates the response button 2055*a* or 2055*b*, a competing game response signal indicative of “participation” or “nonparticipation” is output to the slot machine 2 which outputs the competing game call signal.

After step S41, whether the competing game response signal is received or not is determined (S42). When the competing game response signal is not received (NO in S42), S42 is executed repeatedly. In the case where the competing game response signal is received (YES in S42), subsequently, whether the slot machine 2 participates in the competing game or not is determined on the basis of the competing game response signal (S43).

In the case where the competing game response signal does not include data indicative of “participation” (NO in S43), the routine is finished. In the case where the competing game cannot be played by the neighboring slot machines 2, a competing game may be played with a programmed opponent for competing in the center controller 6 by selection of the player or automatically.

On the other hand, in the case where data indicative of “participation” is included in the competing game response signal (YES in S43), a competing game start signal is output to the center controller 6 (S44). When the center controller 6 executes a server-side competing game process, a competing game (game of life) is played between the neighboring slot machines 2.

While the competing game is run, a competing game result signal transmitted from the center controller 6 is received (S45). Competing game result data includes competing game information such as the auxiliary unit game which is repeatedly run, and payout for the competing game which is run using the auxiliary unit game as a trigger, and the competing game information is notified to the player by display of graphics images, sound output, and light output (S47). After the competing game payout for the competing game is given (S48), the routine is finished.

Although not shown, when an input of the player is necessary, an input request signal is received from the center controller 6, and a process of outputting an input signal is executed. For example, input information to the touch panel 206 such as an input at the time of random determination of the pips of the dice in the auxiliary unit game, an input at the time of selecting the travel direction in the branch part, an input at the time of selection in the competing game, and the like, may be output to the center controller 6.

(Server-Side Competing Game Process)

Figure 12:
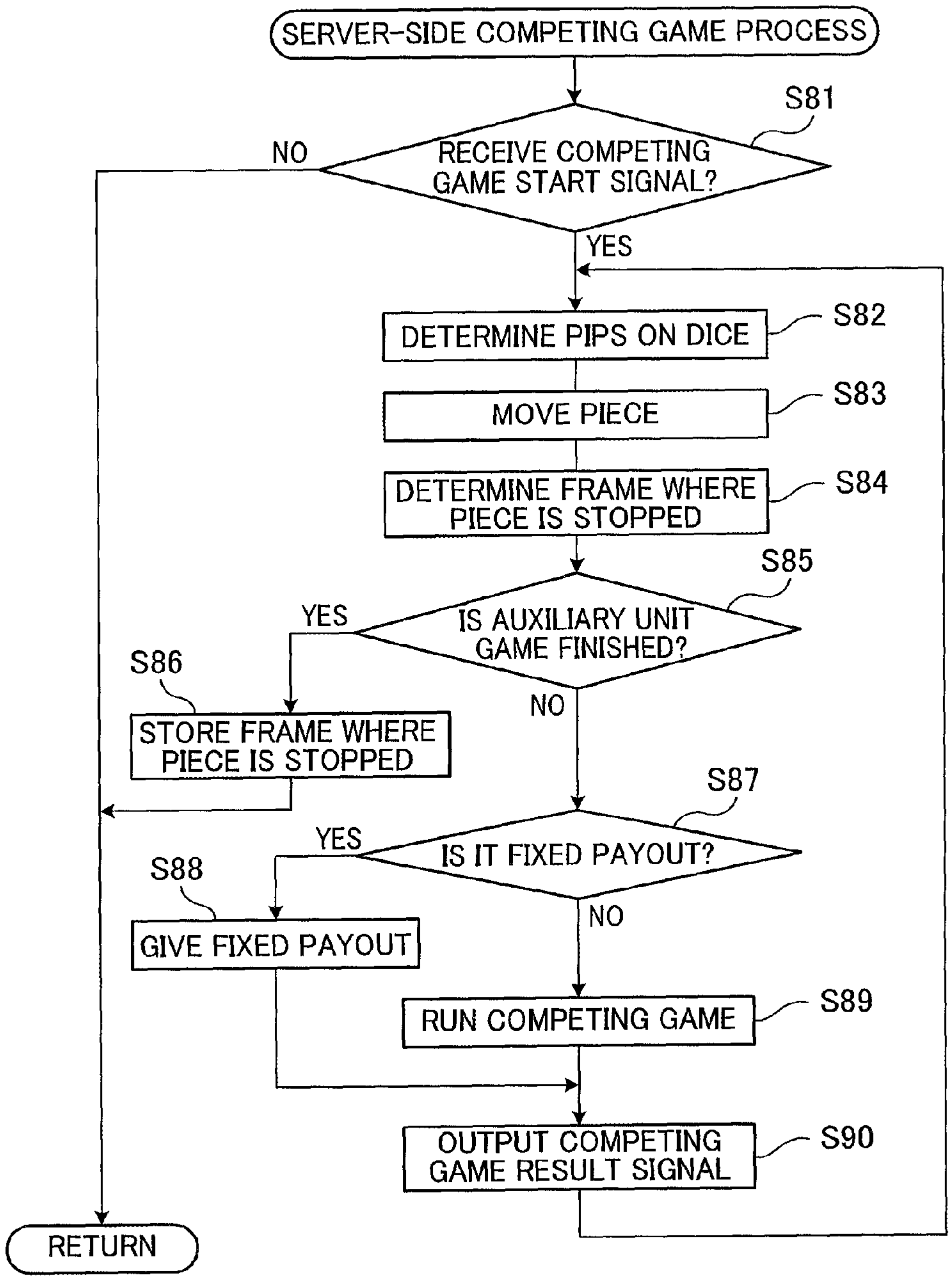
FIG. 12 is a flowchart of a server-side competing game process.

The center controller 6 executes the server-side competing game process as shown in FIG. 12. First, whether the competing game start signal is received or not is determined (S81). If the signal is not received (NO in S81), the routine is finished, and the center controller 6 waits for the competing game start signal by re-execution of S81.

When the competing game start signal is received, the pips on the dice in each of the slot machines 2 are determined (S82). The pips on the dice determined in each of the slot machines 2 may be received. The piece 301 on the common display 3 is moved (S83). The frame 300 on which the piece 301 is stopped is determined (S84).

When it is determined that the auxiliary unit game is finished (YES in S85), the position of the frame 300 in which the frame 301 is stopped is stored (S86), and the routine is finished. When the auxiliary unit game is not finished (NO in S85) but in the case of the fixed payout (YES in S87), the amount of the fixed payout is temporarily stored (S88). On the other hand, in the case where the frame does not correspond to the fixed payout (NO in S87), a competing game is run, and the result of the game is temporarily stored (S89). After step S88 or S89, a competing game result signal is output to each of the slot machines 2, and the program returns to step S82.

Next, whether win or loss of the competing game has been decided or not is determined (S87). If win or loss is not decided (NO in S87), the routine is executed from S83. On the other hand, when win or loss is determined (YES in S87), a competing game result screen indicative of the slot machine 2 as a winner is displayed (S88). After that, the competing game result signal is output (S89), and the routine is finished.

Although the embodiment of the present invention has been described, it is just a concrete example and does not limit the present invention, and concrete configurations such as the means can be properly designed and changed. Concretely, in the present embodiment, as shown in FIG. 1, the gaming machine 1 includes the two slot machines 2 and the common display 3 commonly used by the slot machines 2, and a competing game is played between the neighboring slot machines 2. However, the invention is not limited to the configuration.

For example, the gaming machine 1 may have a configuration that three or more slot machines 2 are disposed in parallel. Further, the gaming machine 1 may be also constructed that some slot machines are connected so that data communications can be performed, and a competing game is played between a slot machine 2 satisfying the competing game condition and a group of one or more slot machines 2 as opponents. That is, the gaming machine 1 can be constructed that, in the case where it is determined that the competing game condition is satisfied, the opponent setting unit 218 in FIG. 2 sets a gaming terminal capable of performing data communications as an opponent.

In the above detailed description, the characteristic parts have been mainly explained so that the present invention can be understood more easily. The present invention is not limited to the embodiment in the above detailed description and can be applied to other embodiments, and the applicable scopes are various. The terms and phraseology in the specification are used to accurately describe the present invention, but not to limit interpretation of the present invention. It is expected that those skilled in the art can easily presume the other configurations, systems, methods, and the like included in the concept of the present invention from the concept of the present invention described in the specification. Therefore, it should be regarded that the description of the scope of claims includes equivalent configurations without departing from the gist of the technical idea of the present invention. The abstract is provided so that patent agencies, general public institutions, technicians belonging to the technical field and unfamiliar with patent, legal terms or technical terms can promptly determine the technical matters and the essence of the application by a simple examination. Therefore, the abstract does not intend to limit the scope of the invention to be evaluated by the description of the scope of claims. It is desired that the disclosed literature and the like is fully referred to and interpreted in order to fully understand the object of the present invention and the effects peculiar to the present invention.

What is claimed is:

1. A gaming machine having two neighboring gaming terminals comprising:

a common display configured to display images for an auxiliary unit game;

a base game running unit configured to run a base game independently in each of the gaming terminals on the basis of a predetermined payout rate;

a payout giving unit configured to give a payout on the basis of a result of the base game;

a competing game condition determining unit configured to determine whether the result of the base game satisfies a predetermined competing game condition or not;

an opponent setting unit configured, in the case where it is determined that the competing game condition is satisfied, to set the neighboring gaming terminals as opponents;

an auxiliary unit game running unit configured to run an auxiliary unit game that is performed together with the opponent and is repetitively run;

a competing game running unit configured, when a result associated with a trigger to run a competing game is obtained in the auxiliary unit game, to run the competing game for winning a payout by competing against the opponent; and a payout adjusting unit configured to, as a result of the competing game, give at least a part of the payout to the winner of the competing game and giving no payout to the loser of the competing game.

2. The gaming machine according to claim 1 wherein the opponent setting unit further comprises an opponent resetting unit configured, in the case where the opponent does not participate in the auxiliary unit game, to set as the opponent a previously programmed computer.

3. The gaming machine according to claim 1 further comprising a competing game refusing unit configured, when set as the opponent, to refuse participation in the auxiliary unit game by an operation of a player.

4. The gaming machine according to claim 1 wherein the payout adjusting unit increases the payout to be given, each time the auxiliary unit game is repeated.

5. The gaming machine according to claim 1 wherein the competing game running unit determines win or loss of the competing game on the basis of an option selected by an operation of a player.

6. The gaming machine according to claim 1 wherein the competing game running unit allocates a payout whose amount is determined at random on the basis of an obtained random determination item or a payout whose amount is pre-determined, to each of the opponents by an operation from the outside and determines win or loss of the competing game on the basis of the amount of the payout.

7. The gaming machine according to claim 1, wherein the competing game is a game for determining one gaming terminal to which the payout is awarded from among the two neighboring gaming terminals.

8. The gaming machine according to claim 1, wherein the auxiliary unit game running unit, when the pieces enter a predetermined stop mode, provides a special payout to the two neighboring gaming terminals.

9. The gaming machine according to claim 1, wherein the competing game is a game for competitively selecting any one of a plurality of symbols that are displayed as options and are respectively associated with payouts to obtain a payout according to the selected symbol.

10. The gaming machine according to claim 1, wherein the competing game is a game for determining whether to exchange payouts between a player and the opponent and for providing the exchanged payouts to the player and the opponent when the payouts are determined to be exchanged.

11. A gaming machine having two neighboring gaming terminals comprising:

a common display configured to display linked frames forming paths and pieces, the pieces corresponding to the neighboring gaming terminals, respectively;

a base game running unit configured to run a base game independently in each of the gaming terminals on the basis of a predetermined payout rate;

a payout giving unit configured to give a payout on the basis of a result of the base game;

a competing game condition determining unit configured to determine whether the result of the base game satisfies a predetermined competing game condition or not;

an opponent setting unit configured, when the competing game condition is satisfied, to set the neighboring gaming terminals as opponents, an auxiliary unit game running unit configured to run an auxiliary unit game that is performed together with the opponent and that is repetitively run;

a display controller configured to cause the common display to display at least one of the pieces moving on the paths by the number of frames according to the result of the auxiliary unit game;

a competing game running unit configured, when at least one of the pieces is stopped on a frame associated with a trigger to run a competing game in the auxiliary unit game, to run the competing game for winning a payout by competing against the opponent; and a competing game refusing unit configured, when set as the opponent, to refuse participation in the auxiliary unit game by an operation of a player.

12. The gaming machine according to claim 11, wherein the opponent setting unit further comprises an opponent resetting unit configured, in the case where the opponent does not participate in the auxiliary unit game, to set as the opponent a previously programmed computer.

13. The gaming machine according to claim 11, further comprising a payout adjusting unit configured to, as a result of the competing game, give at least a part of the payout to the winner of the competing game and giving no payout to the loser of the competing game.

14. The gaming machine according to claim 13, wherein the payout adjusting unit increases the payout to be given, each time the auxiliary unit game is repeated.

15. The gaming machine according to claim 11, wherein the competing game running unit determines win or loss of the competing game on the basis of an option selected by an operation of a player.

16. The gaming machine according to claim 11, wherein the competing game running unit allocates a payout whose amount is determined at random on the basis of an obtained random determination item or a payout whose amount is pre-determined, to each of the opponents by an operation from the outside and determines win or loss of the competing game on the basis of the amount of the payout.

17. The gaming machine according to claim 11, wherein the competing game is a game for determining one gaming terminal to which the payout is awarded from among the two neighboring gaming terminals.

18. The gaming machine according to claim 11, wherein the auxiliary unit game running unit, when the pieces enter a predetermined stop mode, provides a special payout to the two neighboring gaming terminals.

19. The gaming machine according to claim 11, wherein the competing game is a game for competitively selecting any one of a plurality of symbols that are displayed as options and are respectively associated with payouts to obtain a payout according to the selected symbol.

20. The gaming machine according to claim 11, wherein the competing game is a game for determining whether to exchange payouts between a player and the opponent and for providing the exchanged payouts to the player and the opponent when the payouts are determined to be exchanged.

* * * * *